US006997669B2

(12) United States Patent
Kong et al.

(10) Patent No.: US 6,997,669 B2
(45) Date of Patent: Feb. 14, 2006

(54) PARALLEL MANIPULATORS WITH FOUR DEGREES OF FREEDOM

(75) Inventors: Xianwen Kong, Sainte-Foy (CA); Clément Gosselin, Sillery (CA)

(73) Assignee: Université Laval, Québec (CA)

( * ) Notice: Subject to any disclaimer, the term of this patent is extended or adjusted under 35 U.S.C. 154(b) by 50 days.

(21) Appl. No.: 10/291,527

(22) Filed: Nov. 12, 2002

(65) Prior Publication Data

US 2004/0091348 A1    May 13, 2004

(51) Int. Cl.
*B66C 1/00*    (2006.01)
(52) U.S. Cl. .......................... 414/735; 901/15; 901/28; 901/29
(58) Field of Classification Search ............... 414/735; 74/490.08, 490.01; 901/28, 29, 15
See application file for complete search history.

(56) References Cited

U.S. PATENT DOCUMENTS

| 3,419,238 | A | * | 12/1968 | Flory ...................... 248/163.1 |
|---|---|---|---|---|
| 4,976,582 | A | | 12/1990 | Clavel |
| 5,656,905 | A | * | 8/1997 | Tsai ...................... 318/568.21 |
| 5,673,595 | A | * | 10/1997 | Hui et al. ................ 74/490.05 |
| 6,378,190 | B1 | * | 4/2002 | Akeel ...................... 29/407.08 |
| 6,516,681 | B1 | * | 2/2003 | Pierrot et al. ............ 74/490.01 |
| 6,543,987 | B1 | * | 4/2003 | Ehrat ........................ 414/735 |
| 6,729,202 | B1 | * | 5/2004 | Gosselin et al. ......... 74/490.05 |
| 2003/0005786 | A1 | * | 1/2003 | Stuart et al. ............. 74/479.01 |

OTHER PUBLICATIONS

Rolland, Luc H., *"The Manta and the Kanuk: Novel 4-DOF Parallel Mechanisms for Industrial Handling,"* proceedings of 1999 International Mechanical Engineering Congress and Exposition, Nashville, TN, Nov. 1999.
Pierrot, F., Marquet, F., Company, O., Gil, T., *"H4 Parallel Robot: Modeling, Design and Preliminary Experiments,"* proceedings of 2001 IEEE Conference on Robotics and Automation, Seoul, Korea, May 2001.

(Continued)

*Primary Examiner*—Eileen D. Lillis
*Assistant Examiner*—Michael Lowe
(74) *Attorney, Agent, or Firm*—Ogilvy Renault LLP

(57) ABSTRACT

A manipulator for receiving and displacing an object, comprising a moving portion, adapted to receive the object. Four support legs each extend between the moving portion and a ground for supporting the moving portion. Each support leg is connected to the ground by a first joint, and with sequentially second, third, fourth and fifth joints connecting the first joints to the moving portion. The support legs are topologically equivalent to one another with respect to the joints. Each of the support legs has constraints in the joints operable to restrict movement of the moving portion to three translational degrees of freedom and one rotational degree of freedom. Actuators are each operatively connected to a different first joint for controlling the movement of the moving portion in any one of the four translational degrees of freedom. A method for controlling the movement of the moving portion is provided.

7 Claims, 14 Drawing Sheets

OTHER PUBLICATIONS

Huang, Z., *"Kinematics of a Special 3-DOF, 3-TPT Parallel Manipulator,"* proceedings of ASME 2002 Design Engineering Technical Conference and Computers and Information in Engineering Conference, Montréal, Canada, Sep.-Oct. 2002, Publication No. DETC2002/MECH-34322.

Yang, T.L., Jin, Q., Liu, A., Yao, F., Luo, Y., *"Structure Synthesis of 4-DOF (3-Translation and 1-Rotation) Parallel Robot Mechanisms Based on the Units of Single-Opened Chain,"* proceedings of ASME 2001 Design Engineering Technical Conference and Computers and Information in Engineering Conference, Pittsburgh, PA, Sep. 2001, Publication No. DETC2001/DAC-21152.

Brogårdh, T., *"PKM Research—Important Issues, as Seen from a Product Development Perspective at ABB Robotics,"* proceedings of the Workshop on Fundamental Issues and Future Research Directions for Parallel Mechanisms and Manipulators, Québec, Canada, Oct. 2002.

* cited by examiner

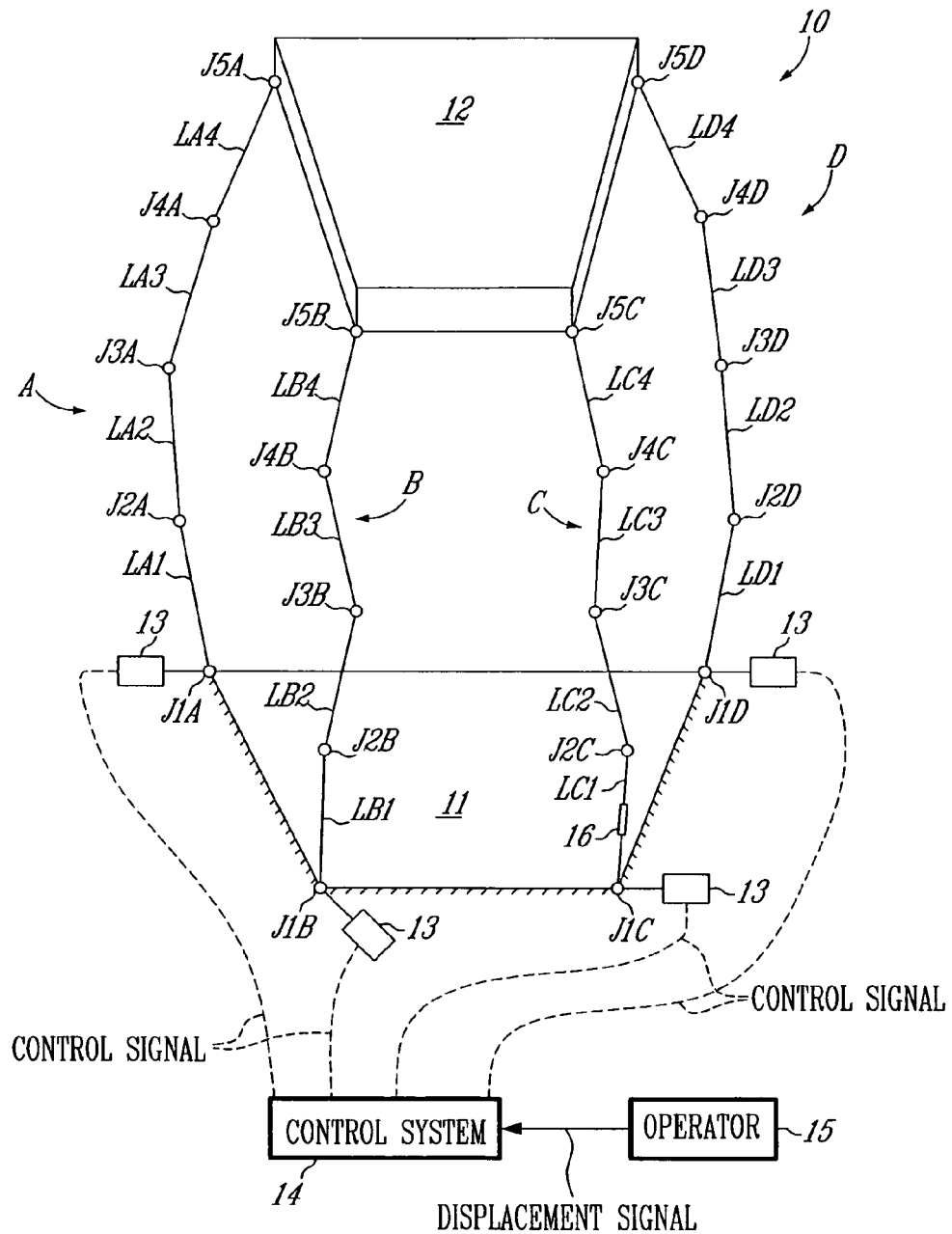
FIG_1

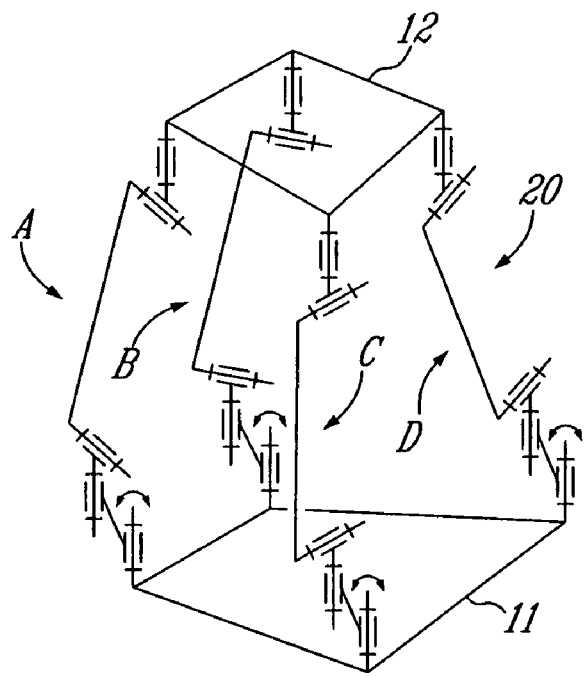
FIG_2
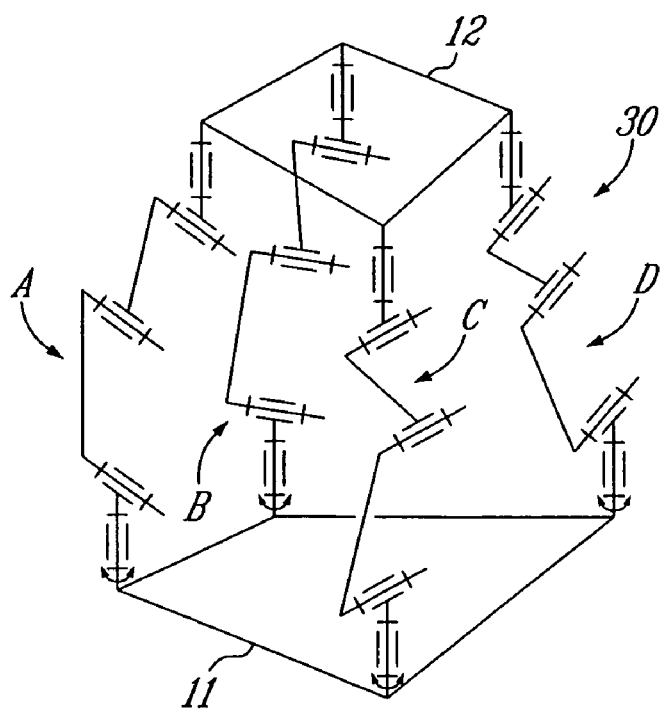
FIG_3

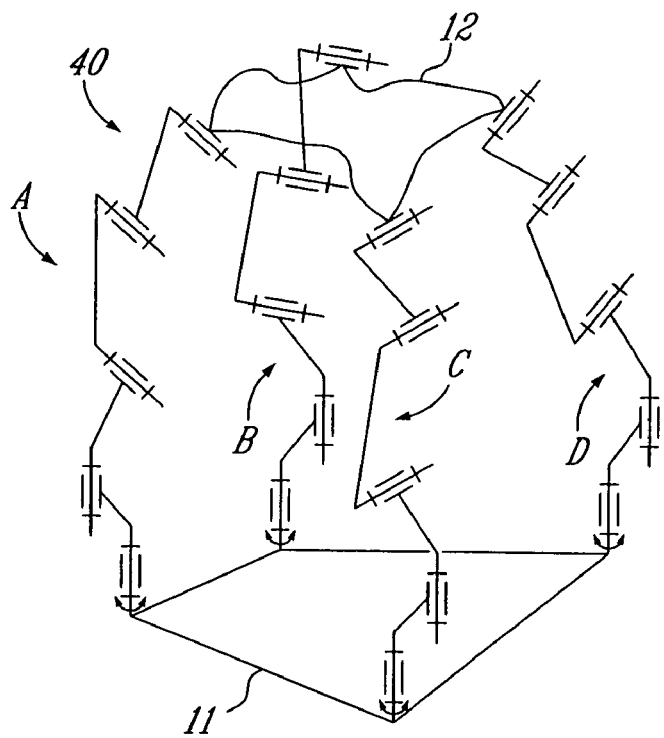
FIG_4
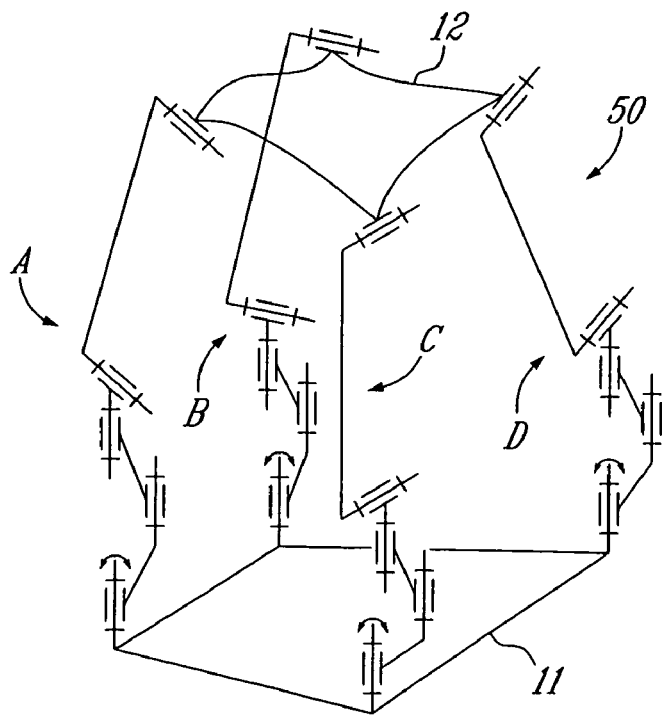
FIG_5

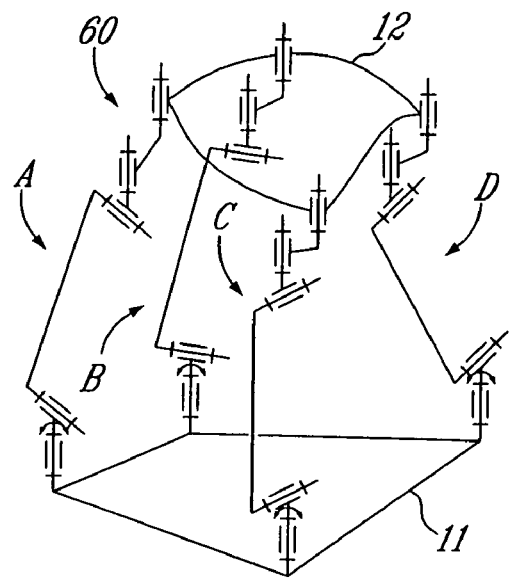
FIG_6
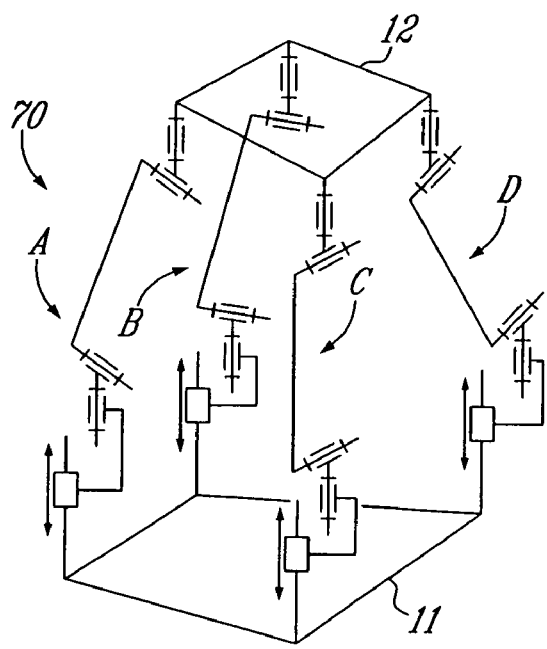
FIG_7

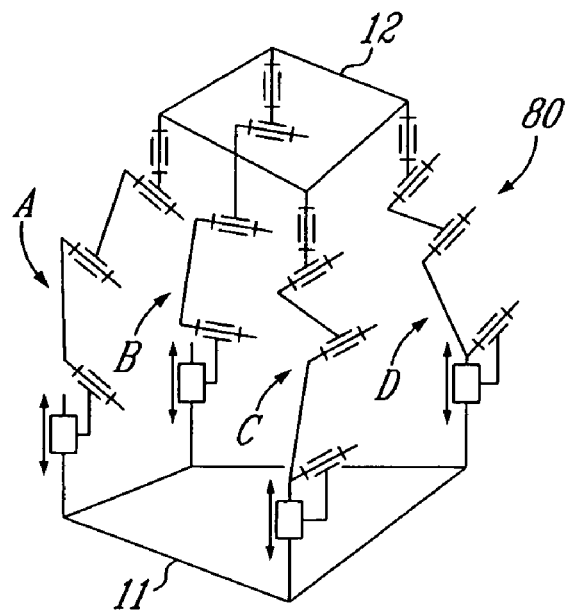
FIG_8
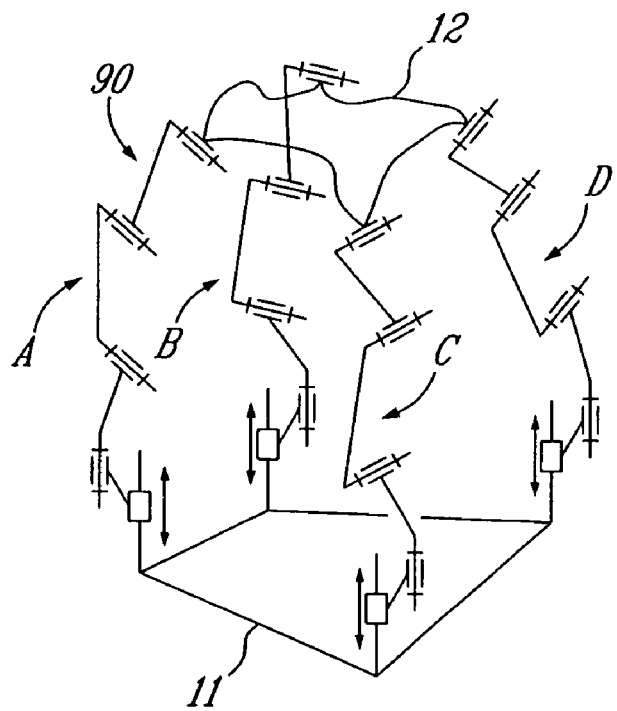
FIG_9

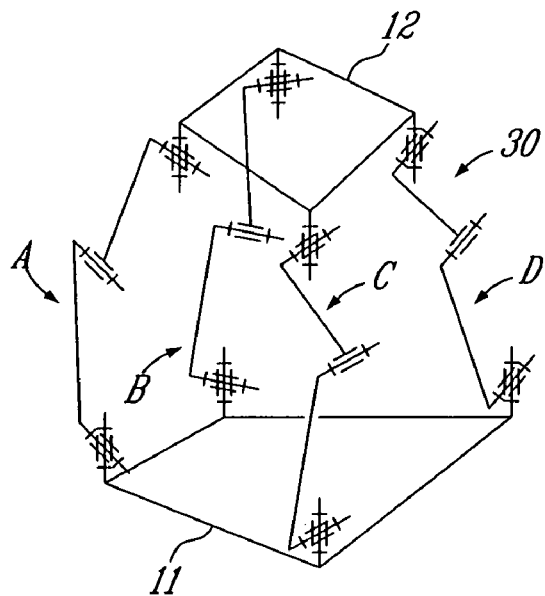
FIG_12
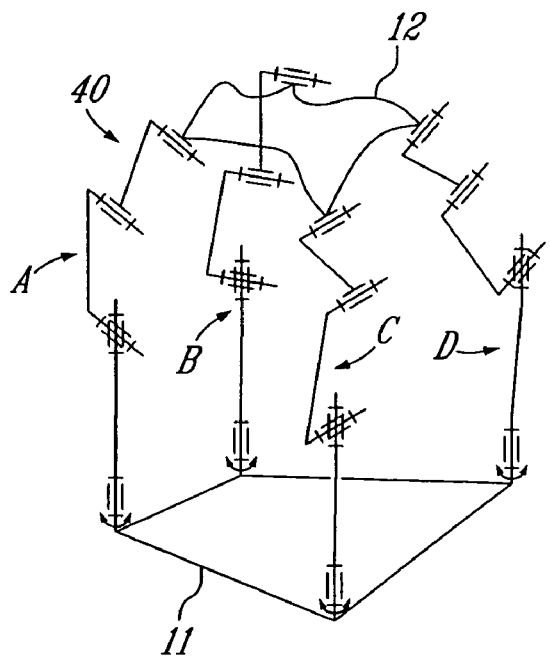
FIG_13

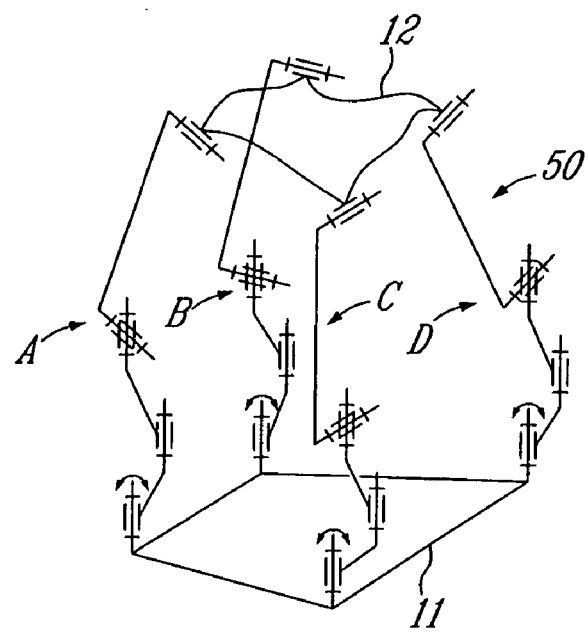
FIG_14
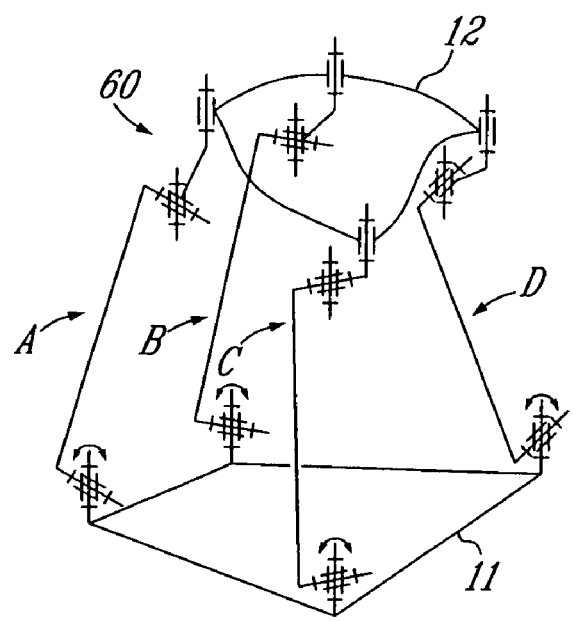
FIG_15

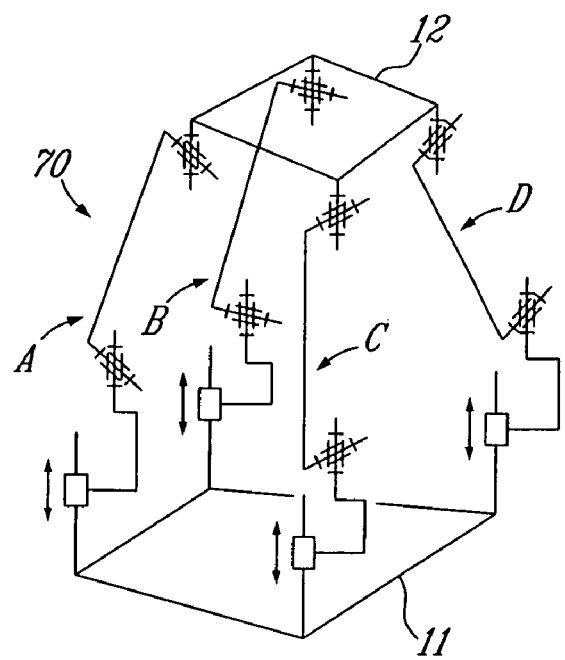
FIG_16
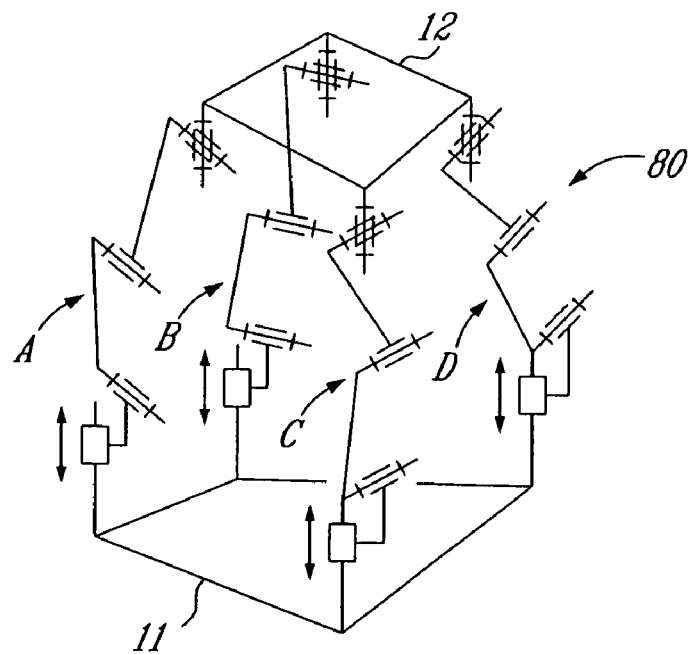
FIG_17

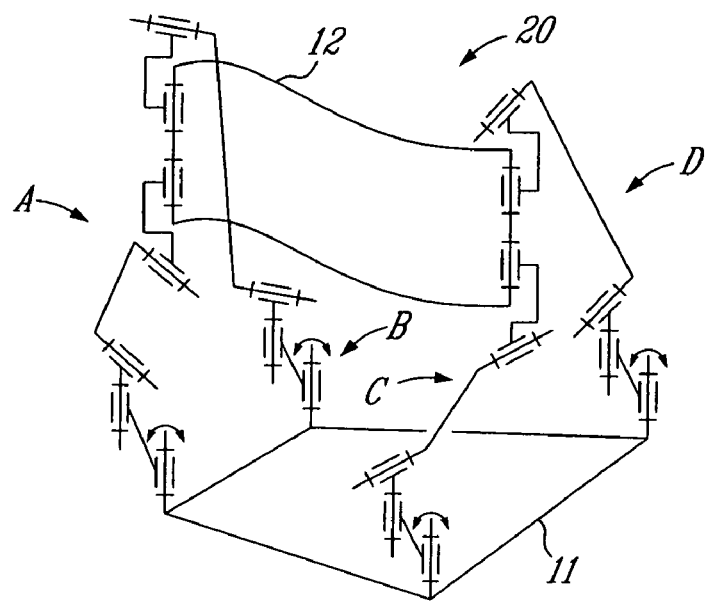
FIG_24
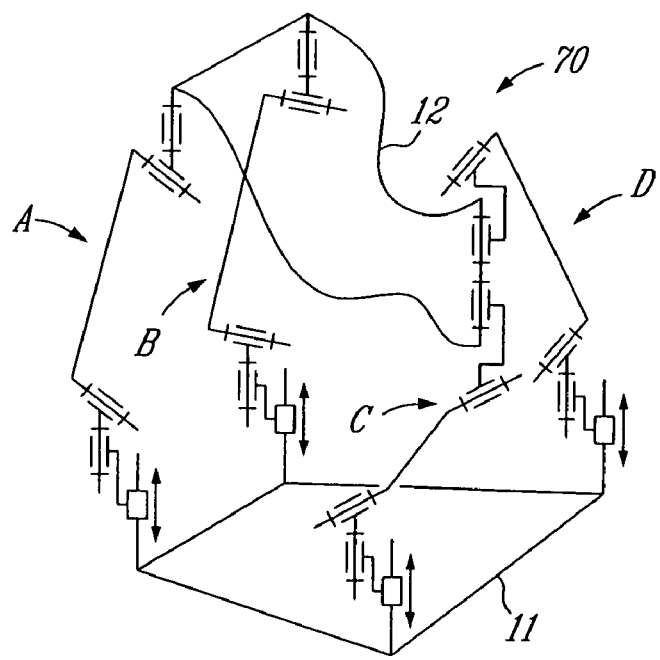
FIG_25

PARALLEL MANIPULATORS WITH FOUR DEGREES OF FREEDOM

FIELD OF THE INVENTION

The present invention relates to parallel manipulators with four degrees of freedom. More particularly, parallel manipulators having three translational degrees of freedom and one rotational degree of freedom are described.

BACKGROUND OF THE INVENTION

Parallel manipulators with three translational degrees of freedom (3T DOF) and one rotational degree of freedom (1R DOF) have a wide range of applications such as assembly, pick-and-place and machine loading, as well as haptic devices. A few 3T1R parallel manipulators have been proposed so far.

3T1R parallel manipulators are proposed by R. Clavel (in U.S. Pat. No. 4,976,582 issued on Dec. 11, 1990), Luc H. Rolland (in "The Manta and the Kanuk: Novel 4-DOF Parallel Mechanisms for Industrial Handling," proceedings of 1999 International Mechanical Engineering Congress and Exposition), and F. Pierrot et al. (in "H4 Parallel Robot: Modeling, Design and Preliminary Experiments," proceedings of 2001 IEEE Conference on Robotics and Automation). The 3T1R parallel manipulators described in these references present such disadvantages as having four legs of different architecture or as having spherical joints.

A 4-DOF parallel manipulator is proposed by Z. Huang (in "Kinematics of a Special 3-DOF, 3-TPT Parallel Manipulator," proceedings of ASME 2002 Design Engineering Technical Conference and Computers and Information in Engineering Conference, DETC2002/MECH-34322). The 4-DOF parallel manipulator described has three legs, each formed of a prismatic joint (hereinafter "P-joint") between a pair of universal joints (hereinafter "U-joint"), hence referred to as a 3-UPU 3R1T parallel manipulator.

Recently, a systematic study on the type synthesis of parallel manipulators has been presented by T. L. Yang et al. (in "Structure Synthesis of 4-DOF (3-Translation and 1-Rotation) Parallel Robot Mechanisms Based on the Units of Single-Opened Chain," proceedings of ASME 2001 Design Engineering Technical Conference and Computers and Information in Engineering Conference, DETC2001/DAC-21152). Three types of four-legged 3T1R parallel manipulators with legs of the same type and no inactive P-joint are proposed. However, only two of the proposed architectures are functional, while the other one in which the four translational DOF of the cylindrical joints (hereinafter "C-joints") are actuated is flawed. In the latter case, the four translational degrees of freedom of the C-joints cannot control the translational degree of freedom of the moving portion along the direction perpendicular to all the axes of the four C-joints. Moreover, the manipulators disclosed by Yang et al. are limited to specific conditions that restrict the possible configurations of the manipulators.

Keeping in mind that it is desired to have parallel manipulators having topologically similar legs and no passive P-joints, broader conditions could be set to incorporate a wider range of 3T1R parallel manipulators. By having general conditions describing groups of configurations limiting output motion of parallel manipulators to three translational DOF and one rotational DOF, 3T1R parallel manipulators could be better adapted for given requirements.

SUMMARY OF THE INVENTION

It is therefore an aim of the present invention to provide conditions for four-legged parallel manipulators to have three-translational degree-of-freedom and one-rotational degree-of-freedom parallel manipulators.

It is a further aim of the present invention to provide configurations of the four-legged parallel manipulators that simplify a kinematic analysis thereof.

It is a still further aim of the present invention to provide a method of controlling motion of groups of configurations of parallel manipulators along three translational degrees of freedom and one rotational degree of freedom.

Therefore, in accordance with the present invention, there is provided a manipulator for receiving and displacing an object, comprising: a moving portion, adapted to receive the object; four articulated support legs each extending between the moving portion and a ground for supporting the moving portion, each of the articulated support legs being connected to the ground by a first joint with axes of the first joints being parallel to one another, and with sequentially second, third, fourth and fifth joints connecting the first joints to the moving portion, the articulated support legs being topologically equivalent to one another with respect to the first, second, third, fourth and fifth joints with each said joint having one rotational degree of freedom, each of the articulated support legs having constraints in the joints operable to restrict movement of the moving portion to three translational degrees of freedom and one rotational degree of freedom; and four angular actuators being each operatively connected to a different one of the first joints for controlling the movement of the moving portion in any one of the three translational degrees of freedom and the one rotational degree of freedom.

Further in accordance with the present invention, there is provided a method for controlling movement of a moving portion of a manipulator in any of three translational degrees of freedom and one rotational degree of freedom, comprising the steps of: providing a manipulator having a moving portion being supported by four articulated support legs each extending between the moving portion and a ground, each of the articulated support legs being connected to the ground by a first joint with axes of the first joints being parallel to one another, and with sequentially second, third, fourth and fifth joints connecting the first joint to the moving portion, the articulated support legs being topologically equivalent to one another with respect to the first, second, third, fourth and fifth joints with each said joint having one rotational degree of freedom, each of the articulated support legs having constraints in the joints operable to restrict movement of the moving portion to three translational degrees of freedom and one rotational degree of freedom; providing four angular degrees of actuation to the manipulator by connecting an actuator to each of the first joints; receiving a displacement signal for a given position and orientation of the moving portion; calculating control signals for the actuators of the first joints as a function of said displacement signal; and displacing the moving portion to the given position and orientation by controlling the four degrees of actuation.

Still further in accordance with the present invention, there is provided a manipulator for receiving and displacing an object, comprising: a moving portion, adapted to receive the object; four articulated support legs each extending between the moving portion and a ground for supporting the moving portion, each of the articulated support legs being connected to the ground by a first joint, and with sequentially second, third, fourth and fifth joints connecting the first joints to the moving portion, the articulated support legs being topologically equivalent to one another with respect to the first, second, third, fourth and fifth joints with each said first joint having one translational degree of freedom and other ones of said joints having one rotational degree of freedom, and with axes of the fourth and fifth joints not all being parallel to one another, each of the articulated support legs having constraints in the joints operable to restrict movement of the moving portion to three translational degrees of freedom and one rotational degree of freedom; and four linear actuators being each operatively connected to a different one of the first joints for controlling the movement of the moving portion in any one of the three translational degrees of freedom and the one rotational degree of freedom.

Still further in accordance with the present invention, there is provided a method for controlling movement of a moving portion of a manipulator in any of three translational degrees of freedom and one rotational degree of freedom, comprising the steps of: providing a manipulator having a moving portion being supported by four articulated support legs each extending between the moving portion and a ground, each of the articulated support legs being connected to the ground by a first joint, and with sequentially second, third, fourth and fifth joints connecting the first joints to the moving portion, the articulated support legs being topologically equivalent to one another with respect to the first, second, third, fourth and fifth joints with each said first joint having one translational degree of freedom and other ones of said joints having one rotational degree of freedom, and with axes of the fourth and fifth joints not all being parallel to one another, each of the articulated support legs having constraints in the joints operable to restrict movement of the moving portion to three translational degrees of freedom and one rotational degree of freedom; providing four linear degrees of actuation to the manipulator by connecting an actuator to each of the first joints; receiving a displacement signal for a given position and orientation of the moving portion; calculating control signals for the actuators of the first joints as a function of said displacement signal; and displacing the moving portion to the given position and orientation by controlling the four degrees of actuation.

Still further in accordance with the present invention, there is provided a manipulator for receiving and displacing an object, comprising: a base; a moving portion, adapted to receive the object; four articulated support legs each extending between the moving portion and the base for supporting the moving portion, each of the articulated support legs being connected to the base by a first R-joint with axes of the first R-joints being parallel to one another, and with sequentially second, third, fourth and fifth R-joints connecting the first R-joints to the moving portion, with axes of the fifth R-joints not all being coplanar, the articulated support legs being topologically equivalent to one another with respect to the first, second, third, fourth and fifth R-joints, the articulated support legs being arranged with respect to one another between the base and the moving portion so as to restrict movement of the moving portion to three translational degrees of freedom and one rotational degree of freedom; and four angular actuators being each operatively connected to a different one of the R-joints for controlling the movement of the moving portion in any one of the three translational degrees of freedom and the one rotational degree of freedom.

BRIEF DESCRIPTION OF THE DRAWINGS

Having thus generally described the nature of the invention, reference will now be made to the accompanying drawings, showing by way of illustration a preferred embodiment thereof and in which:

FIG. 1 is a schematic view of a parallel manipulator having a basic configuration, to be used for reference with embodiments of the present invention;

FIG. 2 is a schematic view of a 4-RRRRR(RUU) parallel manipulator in accordance with a first embodiment of the present invention;

FIG. 3 is a schematic view of a 4-RRRRR(URU) parallel manipulator in accordance with a second embodiment of the present invention;

FIG. 4 is a schematic view of a 4-RRRRR(RURR) parallel manipulator in accordance with a third embodiment of the present invention;

FIG. 5 is a schematic view of a 4-RRRRR(RRUR) parallel manipulator in accordance with a fourth embodiment of the present invention;

FIG. 6 is a schematic view of a 4-RRRRR(UUR) parallel manipulator in accordance with a fifth embodiment of the present invention;

FIG. 7 is a schematic view of a 4-PRRRR(PUU) parallel manipulator in accordance with a sixth embodiment of the present invention;

FIG. 8 is a schematic view of a 4-PRRRR(PRRU) parallel manipulator in accordance with a seventh embodiment of the present invention;

FIG. 9 is a schematic view of a 4-PRRRR(PURR)(CRRR) parallel manipulator in accordance with an eighth embodiment of the present invention;

FIG. 12 is a schematic view of a 4-URU parallel manipulator in accordance with a preferred configuration of the parallel manipulator of FIG. 3;

FIG. 13 is a schematic view of a 4-RURR parallel manipulator in accordance with a preferred configuration of the parallel manipulator of FIG. 4;

FIG. 14 is a schematic view of a 4-RRUR parallel manipulator in accordance with a preferred configuration of the parallel manipulator of FIG. 5;

FIG. 15 is a schematic view of a 4-UUR parallel manipulator in accordance with a preferred configuration of the parallel manipulator of FIG. 6;

FIG. 16 is a schematic view of a 4-PUU parallel manipulator in accordance with a preferred configuration of the parallel manipulator of FIG. 7;

FIG. 17 is a schematic view of a 4-PRRU parallel manipulator in accordance with a preferred configuration of the parallel manipulator of FIG. 8;

FIG. 24 is a schematic view of a 4-RRRRR parallel manipulator in a collinear positioning of two pairs of fifth joints thereof;

FIG. 25 is a schematic view of a 4-PRRRR parallel manipulator in a collinear positioning of a pair of fifth joints thereof;

DESCRIPTION OF THE PREFERRED EMBODIMENTS

Figure 10:
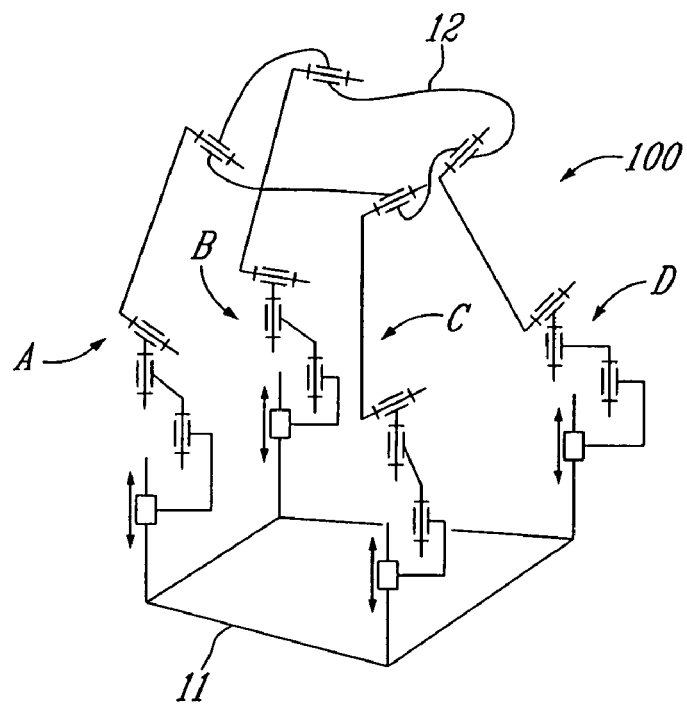
FIG. 10 is a schematic view of a 4-PRRRR(PRUR) parallel manipulator in accordance with a ninth embodiment of the present invention.

Referring to the drawings, and more particularly to FIG. 1, a parallel manipulator is generally shown at 10 and will be used as a reference for describing the various embodiments of the present invention, as all of the embodiments of the present invention have a similar basic configuration.

More precisely, each of the 3T1R parallel manipulators of the present invention is composed of a base 11 (i.e., ground) and a moving portion 12. The base 11 and the moving portion 12 of the parallel manipulator 10 are interconnected by 4 independent legs i, with i=A, B, C and D. The legs i are topologically identical to one another with respect to non-inactive joints. Due to the large variety of legs and for clarity and brevity, each leg i (i=A, B, C and D) is assumed to be composed of 4 links (Li1, Li2, Li3 and Li4, with i=A, B, C, D) and 5 single-DOF joints (Ji1, Ji2 . . . Ji5, with i=A, B, C, D) starting from the base 11 to the moving portion 12. Joints Ji1 connect the links Li1 to the base 11 for all legs i. Joints Ji2 interconnect links Li1 and Li2 for all legs i. Joints Ji3 interconnect links Li2 and Li3 for all legs i. Joints Li4 interconnect links Li3 and Li4 for all legs i. Joints Ji5 interconnect links Li4 to the moving portion 12. Each of these legs has 5 degrees of freedom.

The moving portion 12, also known as end effector, is adapted to support objects, tools, etc., and is the portion of the parallel manipulator 10 subjected to the 4-DOF. The 4-DOF of the moving portion 12 are controlled by actuators 13 mounted to the base 11. The actuators 13 are each connected to a respective joint Ji1 (with i=A, B, C, D) to actuate the displacement of the moving portion 12. It is pointed out that, although the base 11 is illustrated as lying on the ground, the base 11 can also be mounted to walls, etc.

The displacement of the moving portion 12 is controlled by a control system 14 that receives displacement signals from an operator 15. The control system calculates control signals to be sent to the actuators 13 as a function of the displacement signal.

A combination of two adjacent revolution joints (hereinafter "R-joint") with nonparallel intersecting axes can be replaced with a U-joint. A combination of one R-joint and one adjacent P-joint with parallel axes can be replaced with a C-joint. For simplicity purposes, reference hereinafter to i (e.g., leg i, joint Ji1, link Li1) will include all possible values of i, namely, A, B, C and D, unless stated otherwise.

The parallel manipulators of the present invention can generally be separated into two groups of configurations. A first group of configurations includes parallel manipulators illustrated in FIGS. 2 to 6, which each have R-joints only at positions Ji1, Ji2, Ji3, Ji4 and Ji5 (referring to FIG. 1). Accordingly, the parallel manipulators of the first group of configurations each are 4-RRRRR parallel manipulators. The joints Ji1 are actuated, as mentioned previously, and the actuators 13 are consequently angular actuators.

Referring to FIG. 2, a parallel manipulator of the first group of configurations and according to a first embodiment of the present invention is generally shown at 20. The axes of joints Ji1, Ji2 and Ji5 for all legs i are parallel. In each leg i, the axes of joints Ji3 and Ji4 are parallel to one another. In each leg i, the joints Ji1 to Ji5 are not all parallel to a same line. As mentioned previously, joints Ji1 are actuated.

For the parallel manipulator 20, each leg i restricts the rotation of the moving portion 12 about the direction perpendicular to all the axes of the R-joints within the same leg. For each leg i of the manipulator 20, a plane can be defined as parallel to the axes of all R-joints in the leg i. Since the normals to these four planes are all parallel to a fifth plane and not all parallel with respect to one another, any rotation of the moving portion 12 about any direction which is perpendicular to the axes of joints Ji5 is restricted by the total constraints from all the legs i. The moving portion 12 can translate in any direction and rotate about an axis parallel to the axes of joints Ji5. The actuated joints (FIG. 1), which are all located on the base 11, control the motion of the moving portion 12 with respect to the base 11 according to the 4-DOF.

Figure 11:
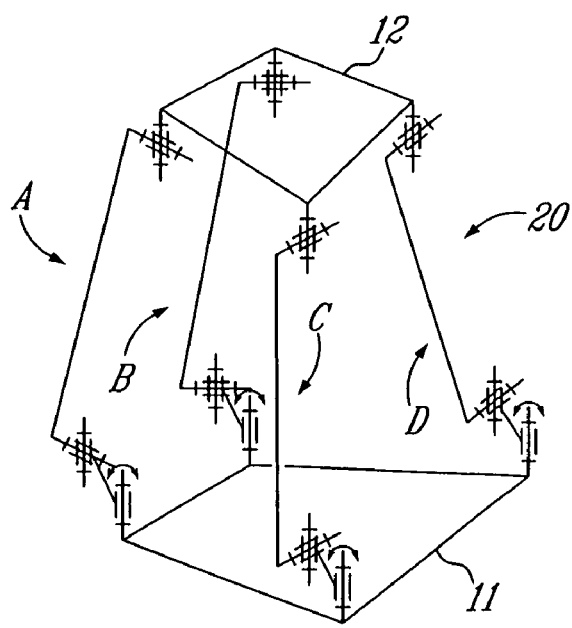
FIG. 11 is a schematic view of a 4-RUU parallel manipulator in accordance with a preferred configuration of the parallel manipulator of FIG. 2.
Figure 21:
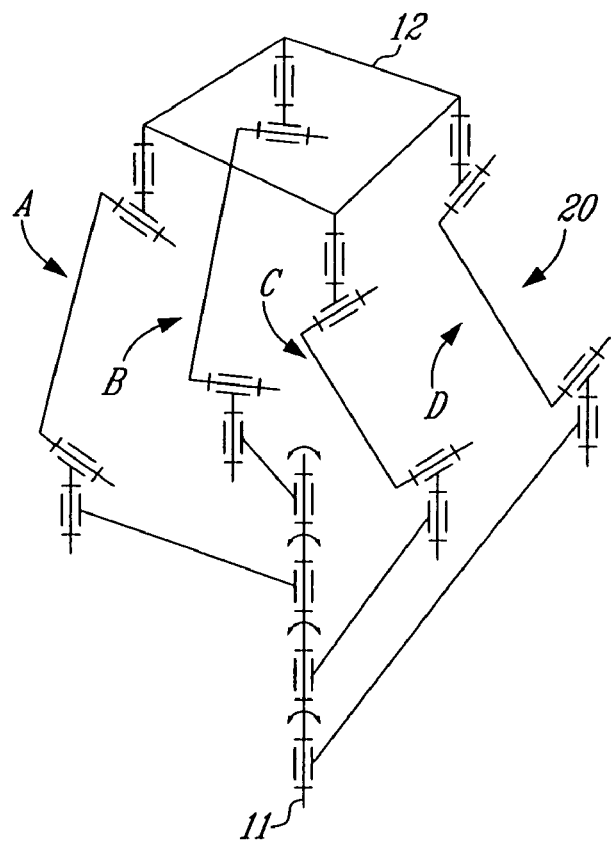
FIG. 21 is a schematic view of a 4-RRRRR parallel manipulator in a collinear positioning of first joints thereof.

In the preferred configuration of the parallel manipulator 20, the joints Ji2 and Ji3 within each leg i are arranged in such a way that they form a U-joint. Similarly, joints Ji4 and Ji5 are also arranged to form a U-joint. In this case, both the structure and the forward displacement analysis are simplified. The parallel manipulator 20 may thus be referred to as a 4-RRRRR(RUU) parallel manipulator, with the (RUU) representing the preferred configuration, which is illustrated in FIG. 11. In the case that the axes of joints Ji1 are all collinear, as illustrated in FIG. 21, the range of rotational motion of the moving portion 12 is unlimited.

Referring to FIG. 3, a parallel manipulator of the first group of configurations and in accordance with a second embodiment of the present invention is generally shown at 30. The parallel manipulator 30 has a 4-RRRRR(URU) configuration. The axes of joints Ji1 and Ji5 are all parallel to one another. In each leg i, the axes of joints Ji2, Ji3 and Ji4 are parallel to one another. The axes of the respective pairs of joints Ji1 and Ji2 of at least one of the legs cannot be perpendicular to one another for all four output DOFs to be controlled. In each leg i, the joints Ji1 to Ji5 are not all parallel to a same line.

In the parallel manipulator 30, each leg i restricts the rotation of the moving portion 12 about the direction perpendicular to all the axes of the R-joints within the same leg. For each leg i of the manipulator 30, a plane can be defined as parallel to the axes of all R-joints in the leg i. Since the normals to these planes are all parallel to a fifth plane and not all parallel to one another, any rotation of the moving portion 12 about any direction which is perpendicular to the axes of joints Ji5 is restricted by the total constraints from all the legs i. The moving portion 12 can translate in any direction and rotate about an axis parallel to the axes of joint Ji5. The actuated joints Ji1 control the motion of the moving portion 12 with respect to the base 11.

In the preferred configuration of the second embodiment, as illustrated in FIG. 12, the joints Ji1 and Ji2 within each leg i are arranged in such a way that they form a U-joint, and similarly for joints Ji4 and Ji5. In this case, both the structure and the forward displacement analysis are simplified. In the case that the axes of joints Ji1 are all collinear, the range of rotational motion of the moving portion 12 is unlimited.

Referring to FIG. 4, a parallel manipulator of the first group of configurations and in accordance with a third embodiment of the present invention is generally shown at 40. The parallel manipulator 40 has a 4-RRRRR(RURR) configuration. The axes of joints Ji1 and Ji2 are parallel to one another. For each leg i, the axes of joints Ji3, Ji4 and Ji5 are parallel to one another. In each leg i, the joints Ji1 to Ji5 are not all parallel to a same line. However, the axes of joints Ji5 cannot all simultaneously be parallel to a same plane, for all four outputs to be controlled.

Each leg i restricts the rotation of the moving portion 12 along the direction perpendicular to all the axes of the R-joints within the same leg i. For each leg i of the manipulator 40, a plane can be defined as parallel to the axes of all R-joints in the leg i. Since the normals to these planes are all parallel to a fifth plane and not all parallel to one another, any rotation of the moving portion 12 along any direction which is perpendicular to the axes of joints Ji1 is restricted by the total constraints from all the legs i. The moving portion 12 can translate in any direction and rotate about an axis parallel to the axes of joints Ji1. The actuated joints Ji1 on the base 11 control the motion of the moving portion 12 with respect to the base 11.

In the preferred configuration of the third embodiment, joints Ji2 and Ji3 within each leg i are arranged in such a way that they form a U-joint, thereby forming the 4-RURR configuration illustrated in FIG. 13. In this case, both the structure and the forward displacement analysis are simplified. In the case that the axes of joints Ji1 are all collinear, the range of rotational motion of the moving portion 12 is unlimited.

Referring to FIG. 5, a parallel manipulator of the first group of configurations and in accordance with a fourth embodiment of the present invention is generally shown at 50. The parallel manipulator 50 has a 4-RRRRR(RRUR) configuration. The axes of joints Ji1, Ji2 and Ji3 are parallel to one another. For each leg i, the axes of joints Ji4 and Ji5 are parallel to one another. In each leg i, the joints Ji1 to Ji5 are not all parallel to a same line. Joints Ji1 are actuated.

Each leg i restricts the rotation of the moving portion 12 along the direction perpendicular to all the axes of the R-joints within the same leg i. For each leg i of the manipulator 50, a plane can be defined as parallel to the axes of all R-joints in the leg i. Since the normals to these planes are all parallel to a fifth plane and not all parallel to one another, any rotation of the moving portion 12 along any direction which is perpendicular to the axes of joints Ji1 is restricted by the total constraints from all the legs i. The moving portion 12 can translate in any direction and rotate about an axis parallel to the axes of joint Ji1. The actuated joints Ji1 on the base 11 control the motion of the moving portion 12 with respect to the base 11.

In the preferred configuration of the fourth embodiment, joints Ji3 and Ji4 within each leg i (i=A, B, C, D) are arranged in such a way that they form a U-joint, thereby forming the 4-RRUR configuration illustrated in FIG. 14. In this case, both the structure and the forward displacement analysis are simplified. In the case that the axes of joints Ji1 are all collinear, the range of rotational motion of the moving portion 12 is unlimited.

Referring to FIG. 6, a parallel manipulator in accordance with a fifth embodiment of the present invention is generally shown at 60. The parallel manipulator 60 has a 4-RRRRR (UUR) configuration. The axes of joints Ji1, Ji4 and Ji5 are parallel to one another. For each leg i, the axes of joints Ji2 and Ji3 are parallel to one another. In each leg i, the joints Ji1 to Ji5 are not all parallel to a same line.

Each leg i restricts the rotation of the moving portion 12 along the direction perpendicular to all the axes of the R-joints within the same leg. For each leg i of the manipulator 60, a plane can be defined as parallel to the axes of all R-joints in the leg i. Since the normals to these planes are all parallel to a fifth plane and not all parallel to one another, any rotation of the moving portion along any direction which is perpendicular to the axes of joint Ji5 is restricted by the total constraints from all the legs i. The moving portion 12 can translate in any direction and rotate about an axis parallel to the axes of joints Ji5. The actuated joints Ji1 on the base 11 control the motion of the moving portion 12 with respect to the base 11.

In the preferred configuration of the fifth embodiment, joints Ji1 and Ji2 within each leg i are arranged in such a way that they form a U-joint, and similarly for joints Ji3 and Ji4, thereby forming the preferred configuration 4-UUR illustrated in FIG. 15. In this case, both the structure and the forward displacement analysis are simplified. In the case that the axes of joints Ji1 are all collinear, the range of rotational motion of the moving portion 12 is unlimited.

It is noted that one common characteristic to the 4-RRRRR parallel manipulators is that all of the embodiments (FIGS. 2 to 6) describe the axes of Ji1 as being parallel to one another. Yang et al. embodiments of 4-RRRRR parallel manipulators do not include this condition in a functional manner (in "Structure Synthesis of 4-DOF (3-Translation and 1-Rotation) Parallel Robot Mechanisms Based on the Units of Single-Opened Chain," proceedings of ASME 2001 Design Engineering Technical Conference and Computers and Information in Engineering Conference, DETC2001/DAC-21152). More precisely, the 4-RRRRR parallel manipulators of Yang et al. describe an inverted version of a parallel manipulator having this condition, but the other conditions for all DOF to be controlled are not given.

Figure 22:
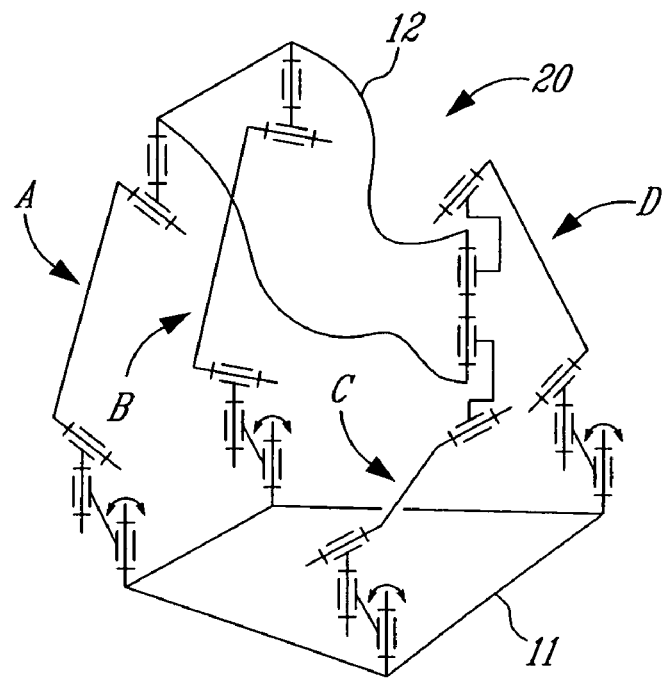
FIG. 22 is a schematic view of a 4-RRRRR parallel manipulator in a collinear positioning of a pair of fifth joints thereof.
Figure 23:
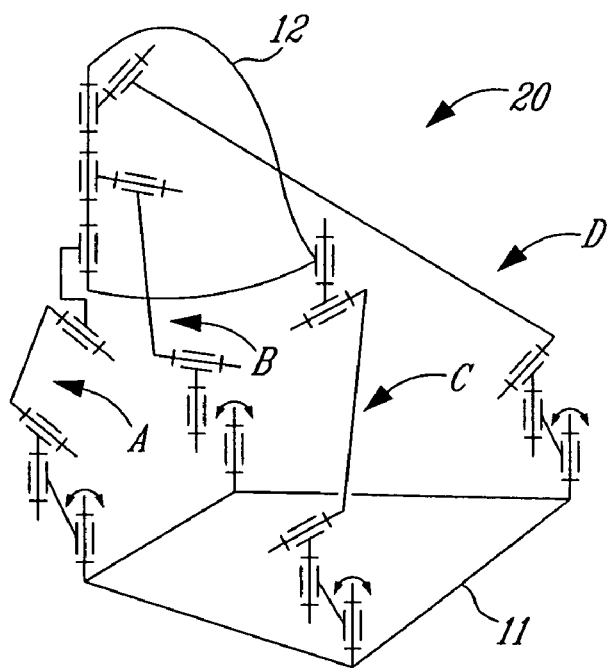
FIG. 23 is a schematic view of a 4-RRRRR parallel manipulator in a collinear positioning of three fifth joints thereof.

It is noted that given configurations of the manipulators can be provided to simplify the forward kinematic analysis. For instance, the parallel manipulators 20 (FIG. 2), 30 (FIG. 3) and 60 (FIG. 6) have their forward displacement analysis simplified if:

a) the axes of two of the four joints Ji5 are collinear. This is illustrated as an example in FIG. 22 for the manipulator 20;

b) the axes of three of the four joints Ji5 are collinear. This is illustrated in FIG. 23 for the manipulator 20; or c) a first and a second pair of the four joints Ji5 are collinear without all four Ji5 joints being collinear to one another. This is illustrated in FIG. 24 for the manipulator 20.

A second group of configurations includes parallel manipulators illustrated in FIGS. 7 to 10, which each have R-joints at positions Ji2, Ji3, Ji4 and Ji5 (referring to FIG. 1) and a P-joint at position Ji1. Accordingly, the parallel manipulators of the second group of configurations each have a 4-PRRRR configuration. The joints Ji1 being actuated, the actuators 13 are linear actuators (e.g., cylinders).

Referring to FIG. 7, a parallel manipulator of the second group of configurations and according to a sixth embodiment of the present invention is generally shown at 70. The parallel manipulator 70 has a 4-PRRRR(PUU) configuration. The axes of joints Ji2 and Ji5 for all legs i are parallel. The axes of joints Ji3 and Ji4 within leg i are parallel. In each leg i, the joints Ji2 to Ji5 are not all parallel to a same line.

For the parallel manipulator 70, each leg i restricts the rotation of the moving portion 12 about the direction perpendicular to all the axes of the R-joints within the same leg. For each leg i of the manipulator 70, a plane can be defined as parallel to the axes of all R-joints in the leg i. Since the normals to these four planes are all parallel to a fifth plane and not all parallel with respect to one another, any rotation of the moving portion 12 about any direction which is perpendicular to the axes of joints Ji5 is restricted by the total constraints from all the legs i. The moving portion 12 can translate in any direction and rotate about an axis parallel to the axes of joints Ji5. The actuated P-joints located on the base 11 control the motion of the moving portion 12 with respect to the base 11 according to the 4-DOF.

The direction of joints Ji1 can be arranged in parallel, coplanarly as well as in star shape, V-shape and T-shape, etc. The particular arrangement of the direction of joints Ji1 depends on the specific application of the parallel manipulator.

In the preferred configuration of the sixth embodiment, as illustrated in FIG. 16, joints Ji2 and Ji3 within leg i (i=A, B, C, D) are arranged in such a way that they form a U-joint, and similarly for joints Ji4 and Ji5. Additionally, the direction of joints JA1, JB1, JC1 and JD1 are all parallel to a line which is parallel to or perpendicular to the axes of joints Ji2 (i=A, B, C, D). In this case, both the structure and the forward displacement analysis are simplified. In addition, the translational workspace along the direction parallel to the direction of joints Ji1 is enlarged.

Referring to FIG. 8, a parallel manipulator of the second group of configurations and in accordance with a seventh embodiment of the present invention is generally shown at 80. The parallel manipulator 80 has a 4-PRRRR(PRRU) configuration. The axes of joints Ji5 are parallel to one another. For each leg i, the axes of joints Ji2, Ji3 and Ji4 are parallel to one another. However, the axes of joints Ji2 cannot all simultaneously be parallel to a same plane, for all four outputs to be controlled. For each leg i, the direction of joint Ji1 cannot be perpendicular to the axis of joint Ji2. In each leg i, the joints Ji2 to Ji5 are not all parallel to a same line.

Each leg i restricts the rotation of the moving portion 12 along the direction perpendicular to all the axes of the R-joints within the same leg i. For each leg i of the manipulator 80, a plane can be defined as parallel to the axes of all R-joints in the leg i. Since the normals to these planes are all parallel to a fifth plane and not all parallel to one another, any rotation of the moving portion 12 about any direction which is perpendicular to the axes of joints Ji5 is restricted by the total constraints from the legs i. The moving portion 12 can translate in any direction and rotate about an axis parallel to the axes of joints Ji5. The actuated joints Ji1 on the base 11 control the motion of the moving portion 12 with respect to the base 11.

The direction of joints Ji1 can be arranged so as to be parallel, coplanar, as well as in a star shape, V-shape or T-shape, etc. The particular arrangement of the direction of joints Ji1 depends on the specific application of the parallel manipulator 80.

In the preferred configuration of the seventh embodiment, as illustrated in FIG. 17, joints Ji4 and Ji5 within leg i (i=A, B, C, D) are arranged in such a way that they form a U-joint, thereby forming the 4-PRRU configuration. In addition, the direction of joints Ji1 are all parallel to a line which is parallel to or perpendicular to the axes of joints Ji5. In this case, both the structure and the forward displacement analysis are simplified. In addition, the translational workspace along the direction parallel to the direction of joints Ji1 is enlarged.

Referring to FIG. 9, a parallel manipulator in accordance with an eighth embodiment of the present invention is generally shown at 90. The parallel manipulator 90 has a 4-PRRRR(PURR)(CRRR) configuration. The axes of joints Ji2 are parallel to one another. For each leg i, the axes of joints Ji3, Ji4 and Ji5 are parallel. However, the axes of joints Ji5 cannot all simultaneously be parallel to a same plane, for all four outputs to be controlled. If, for each leg i, the axis of joint Ji2 is perpendicular to the axis of joint Ji3, then the direction of joint Ji1 cannot be parallel to the axis of joint Ji2. In each leg i, the joints Ji2 to Ji5 are not all parallel to a same line. The joints Ji1 are actuated.

Each leg i restricts the rotation of the moving portion 12 along the direction perpendicular to the axes of the R-joints within the same leg i. For each leg i of the manipulator 90, a plane can be defined as parallel to the axes of all R-joints in the leg i. Since the normals to these planes are all parallel to a fifth plane and not all parallel to one another, any rotation of the moving portion 12 along any direction which is perpendicular to the axes of joints Ji2 is restricted by the total constraints from all the legs i. The moving portion 12 can translate in any direction and rotate about any axis parallel to the axes of joints Ji2. The actuated P-joints on the base 11 control the motion of the moving portion 12 with respect to the base 11.

The direction of joints Ji1 can be arranged so as to be parallel, coplanar, as well as in a star shape, a V-shape or a T-shape, etc. The particular arrangement of the direction of joints Ji1 depends on the specific application of the parallel manipulator 90.

Figure 18:
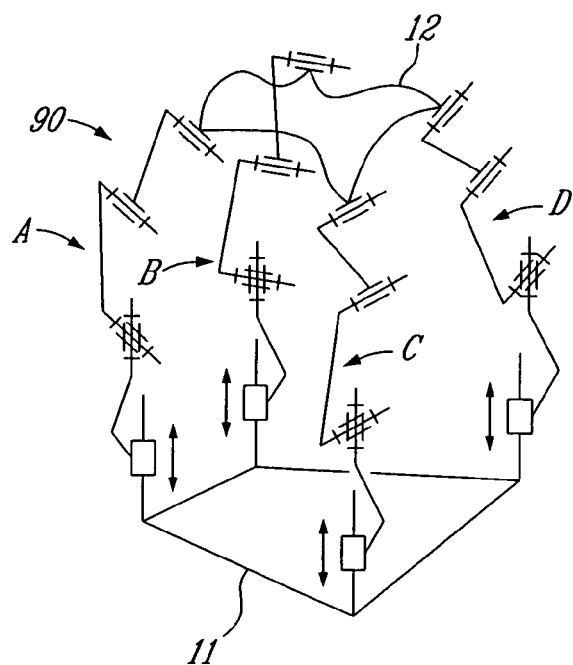
FIG. 18 is a schematic view of a 4-PURR parallel manipulator in accordance with a preferred configuration of the parallel manipulator of FIG. 9.

In the first preferred configuration of the eighth embodiment, as illustrated in FIG. 18, joints Ji2 and Ji3 within leg i (i=A, B, C, D) are arranged in such a way that they form a U-joint, thereby forming the preferred configuration 4-PURR. In addition, the direction of the joints Ji1 are all parallel to a line which is parallel to or perpendicular to the axes of joints Ji2. In this case, both the structure and the forward displacement analysis are simplified. In addition, the translational workspace along the direction parallel to the direction of the joints Ji1 is enlarged.

Figure 19:
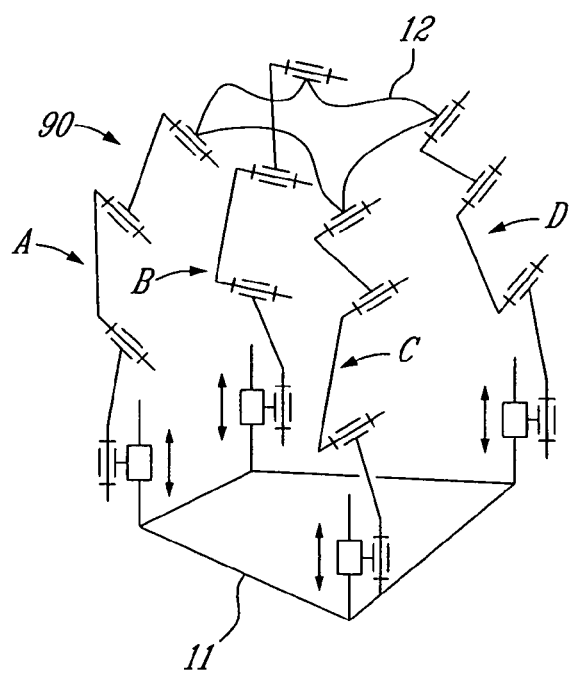
FIG. 19 is a schematic view of a 4-CRRR parallel manipulator in accordance with a preferred configuration of the parallel manipulator of FIG. 9.

In the second preferred configuration of the eighth embodiment, joints Ji1 and Ji2 within leg i are arranged in such a way that they form a C-joint, thereby forming the 4-CRRR configuration, as illustrated in FIG. 19. In this case, the translational workspace along the direction parallel to the axes of the joints Ji1 is enlarged.

Referring to FIG. 10, a parallel manipulator in accordance with a ninth embodiment of the present invention is generally shown at 100. The parallel manipulator 100 has a 4-PRRRR(PRUR) configuration. The axes of joints Ji2 and Ji3 are all parallel to one another. For each leg i, the axes of joints Ji4 and Ji5 are parallel to one another. In each leg i, the joints Ji2 to Ji5 are not all parallel to a same line.

Each leg i restricts the rotation of the moving portion 12 along the direction perpendicular to all the axes of the R-joints within the same leg i. For each leg i of the manipulator 100, a plane can be defined as parallel to the axes of all R-joints in the leg i. Since the normals to these planes are all parallel to a fifth plane and not all parallel, any rotation of the moving portion 12 along any direction which is perpendicular to the axes of joint Ji2 is restricted by the total constraints from all the legs i. The moving portion 12 can translate in any direction and rotate about an axis parallel to the axes of joint Ji2. The actuated P-joints Ji1 on the base 11 control the motion of the moving portion 12 with respect to the base 11.

The direction of joints Ji1 can be arranged so as to be parallel, coplanar, as well as in a star shape, a V-shape or a T-shape, etc. The particular arrangement of the direction of joints Ji1 depends on the specific application of the parallel manipulator 100.

Figure 20:
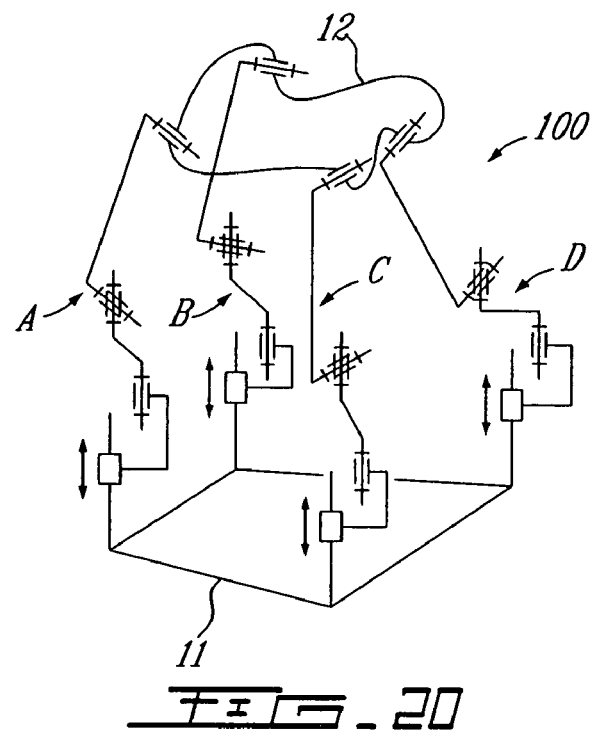
FIG. 20 is a schematic view of a 4-PRUR parallel manipulator in accordance with a preferred configuration of the parallel manipulator of FIG. 10.

In the preferred configuration of the ninth embodiment, joints Ji3 and Ji4 within each leg i are arranged in such a way that they form a U-joint, thereby forming the preferred embodiment of 4-PRUR, as illustrated in FIG. 20. In addition, the direction of joints Ji1 are all parallel to a line which is parallel to or perpendicular to the axes of joints Ji2. In this case, both the structure and the forward displacement analysis are simplified. In addition, the translational workspace along the direction parallel to the direction of joints Ji1 is enlarged.

Figure 26:
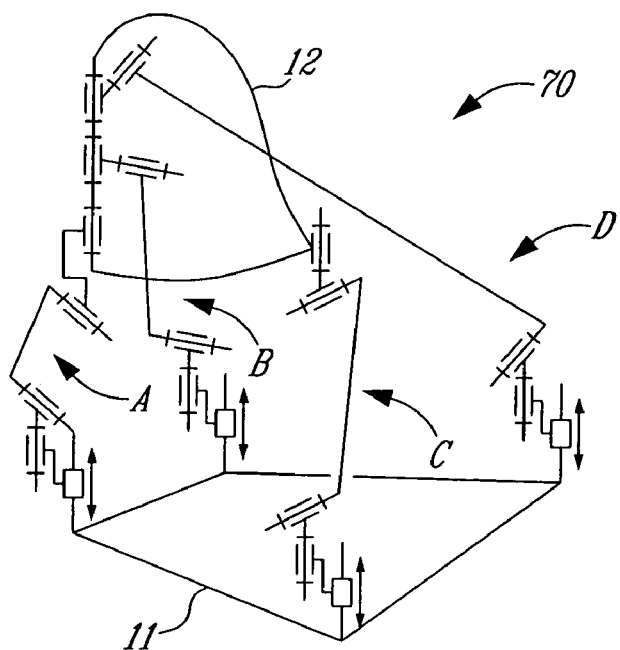
FIG. 26 is a schematic view of a 4-PRRRR parallel manipulator in a collinear positioning of three fifth joints thereof.
Figure 27:
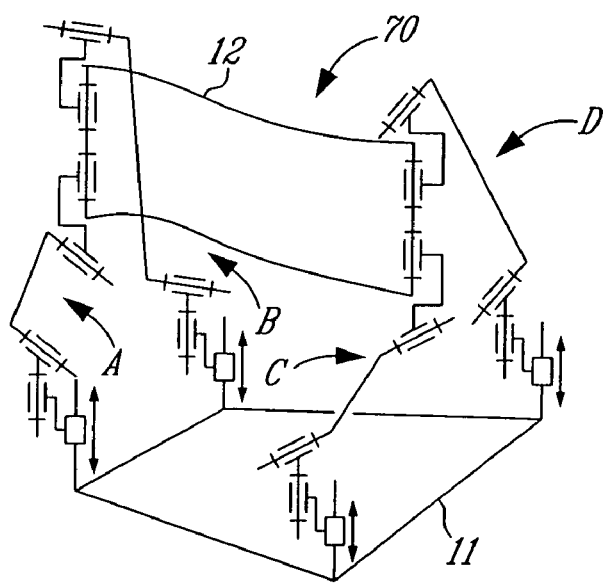
FIG. 27 is a schematic view of a 4-PRRRR parallel manipulator in a collinear positioning of two pairs of fifth joints thereof.

It is noted that given configurations of the manipulators can be provided to simplify the forward kinematic analysis. For instance, the parallel manipulators 70 (FIG. 7) and 80 (FIG. 8) have their forward displacement analysis simplified if:

a) the axes of two of the four joints Ji5 are collinear. This is illustrated as an example in FIG. 25 for the manipulator 70;

b) the axes of three of the four joints Ji5 are collinear. This is illustrated in FIG. 26 for the manipulator 70; or c) a first and a second pair of the four joints Ji5 are collinear without all four Ji5 joints being collinear to one another. This is illustrated in FIG. 27 for he manipulator 70.

It is noted that one common characteristic to the 4-PRRRR parallel manipulators is that none of the embodiments (FIGS. 7 to 10) describes all axes of Ji4 and Ji5 being parallel to one another. All Yang et al. embodiments of 4-PRRRR parallel manipulators include this condition (in "Structure Synthesis of 4-DOF (3-Translation and 1-Rotation) Parallel Robot Mechanisms Based on the Units of Single-Opened Chain," proceedings of ASME 2001 Design Engineering Technical Conference and Computers and Information in Engineering Conference, DETC2001/DAC-21152).

In any one of the above 3T1R parallel manipulators of FIGS. 2 to 10, the two restricted rotational DOFs of the parallel manipulators are constrained by a total of four constraints, with one constraint per leg i. Two of the constraints, therefore, are overconstraints. The parallel manipulator is thus an overconstrained mechanism and does not satisfy the general mobility equation of mechanisms, i.e.:

(130)

$$f = 6(n - g - 1) + \sum_{i=1}^{g} f_i$$

where n, g, f and $f_i$ denote the number of links, the number of joints, the degree of freedom of a spatial mechanism and the degree of freedom of joint i, respectively.

For any one of the above 3T1R parallel manipulators, n=18, g=20, and $f_i$=1. Therefore, from equation (130), we obtain f=2. The difference between the value of f and the actual DOFs 4 of the parallel manipulator is equal to the number of overconstraints 2.

To reduce the number of overconstraints, one or two legs of each of the above 3T1R parallel manipulators can be replaced with a leg with 6 DOFs. The introduction of one leg with 6 DOFs will reduce one overconstraints. If five joints in a leg with 6 DOFs are arranged in the same way as five joints in a leg with 5 DOFs, the other one joint is an inactive joint that will not change the topology of the legs i with respect to the active and passive joints. An inactive joint is illustrated at 16 in FIG. 1.

What is claimed is:

1. A manipulator for receiving and displacing an object, comprising:
   a base;
   a moving portion, adapted to receive the object;
   four articulated support legs each extending between the moving portion and the base for supporting the moving portion, each of the articulated support legs being connected to the base by a first R-joint with axes of the first R-joints being parallel to one another, and with sequentially second, third, fourth and fifth R-joints connecting the first R-joints to the moving portion, with axes of the fifth R-joints not all being coplanar, the articulated support legs being topologically equivalent to one another with respect to the first, second, third, fourth and fifth R-joints, the articulated support legs being arranged with respect to one another between the base and the moving portion so as to restrict movement of the moving portion to three translational degrees of freedom and one rotational degree of freedom; and
   four angular actuators being each operatively connected to a different one of the R-joints for controlling the movement of the moving portion in any one of the three translational degrees of freedom and the one rotational degree of freedom.

2. The manipulator according to claim 1, wherein the four angular actuators are each operatively connected to a different one of the first R-joints.

3. The manipulator according to claim 2, further comprising a control system receiving a displacement signal for a given position and orientation of the moving portion, and connected to said four angular actuators, said control system calculating control signals for the actuators of the first joints as a function of said displacement signal, and displacing the moving portion to the given position and orientation by controlling the four degrees of actuation.

4. The manipulator according to claim 1, wherein the axes of the first R-joints are substantially vertical with respect to the base.

5. The manipulator according to claim 1, wherein the one rotational degree of freedom is about an axis generally normal to the base.

6. The manipulator according to claim 1, wherein the axes of two R-joints of the second, third, fourth and fifth R-joints are parallel to the axis of the first R-joint in each leg, with the remaining two R-joints being adjacent in each leg and with axes of the remaining two R-joints being parallel to one another in each leg and not parallel to said first R-joint in the leg, the axes of the remaining two R-joints not all being parallel to one another.

7. The manipulator according to claim 1, wherein the axis of one R-joint of the second and fifth R-joints is parallel to the axis of the first R-joint in each leg, with axes of the remaining three R-joints being parallel to one another in each leg and not parallel to said first R-joint in the leg, the axes of the remaining three R-joints of all the legs not all being parallel to a same plane.

* * * * *